United States Patent [19]

Yoshimura et al.

[11] Patent Number: 5,488,870
[45] Date of Patent: Feb. 6, 1996

[54] CORIOLIS TYPE MASS FLOW METER

[75] Inventors: Hiroyuki Yoshimura, Kanagawa; Osamu Kashimura, Tokyo, both of Japan

[73] Assignee: Fuji Electric Co., Ltd., Japan

[21] Appl. No.: 307,260

[22] Filed: Sep. 16, 1994

[30] Foreign Application Priority Data

Sep. 21, 1993 [JP] Japan .................. 5-235156

[51] Int. Cl.$^6$ .................................................. G01F 1/78
[52] U.S. Cl. ............................ 73/861.38; 73/861.37
[58] Field of Search ........................... 73/861.37, 861.38

[56] References Cited

U.S. PATENT DOCUMENTS

| | | | |
|---|---|---|---|
| 4,747,312 | 5/1988 | Herzel | 73/861.38 |
| 4,949,583 | 8/1990 | Lang et al. | 73/861.37 |
| 5,218,873 | 6/1993 | Lang | 73/861.37 |
| 5,365,794 | 11/1994 | Hussain et al. | 73/861.37 |
| 5,373,745 | 12/1994 | Cage | 73/861.37 |

*Primary Examiner*—Thomas P. Noland
*Assistant Examiner*—Jewel V. Artis
*Attorney, Agent, or Firm*—Parkhurst, Wendel & Rossi

[57] ABSTRACT

Measurement of a mass flow rate is accomplished by equalizing the output amplitude values of upstream and downstream sensors without causing a lowering of the mechanical Q of a vibration system. One of the upstream and downstream sensors includes a permanent magnet disposed on a side of a tube and an induction coil disposed on a side of a base, the output voltage amplitude of which is fixed. Another sensor includes a ferromagnetic member disposed on the side of the tube and an excitation coil and an induction coil disposed on the side of the base. The output voltage amplitude of the induction coil is controlled to be coincident with the output voltage amplitude of the induction coil by adjusting a DC current flowing through the excitation coil.

4 Claims, 11 Drawing Sheets

CORIOLIS TYPE MASS FLOW METER

FIELD OF THE INVENTION

The present invention relates to a Coriolis type mass flow meter that measures a mass flow rate of a fluid by detecting a phase a difference between vibrations, on up and down stream sides of a tube through which a fluid flows, that are excited by a Coriolis force which depends on the mass and velocity of the fluid.

BACKGROUND

Figure 8:
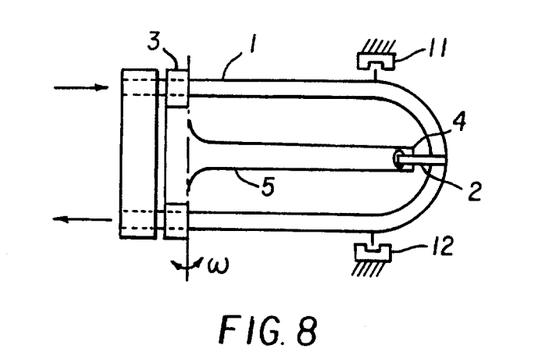
FIG. 8 is a diagram showing an operation principle of the general Coriolis type mass flow meter.

An operational principle of a general Coriolis type mass flow meter will be described with reference to FIG. 8. The mass flow meter includes a U-shape tube 1 through which a fluid to be measured flows. A permanent magnet 2 is fixed to a bottom portion of the U-shape tube 1. Both ends of the U-shape tube 1 are fixed to a base 3. An electromagnetic drive coil 4 is disposed in a manner such that the drive coil 4 sandwiches the tube 1 and a support frame 5 tightly fixed to the base 3 for supporting the drive coil 4. The U-shape tube 1 has its vibration nodes at the portions fixed to the base 3 and a structure which looses less vibration energy like a tuning fork. Electromagnetic pickups 11, 12 are provided for detecting displacement of both arms of the U-shape tube 1. The Coriolis force is generated in the fluid flowing through the U-shape tube 1 by vibrating the tube 1 at its normal frequency $\omega$ by an electromagnetic force acting between the drive coil 4 and the permanent magnet 2 fixed to the tube 1 and facing opposite to the drive coil 4.

Figure 9:
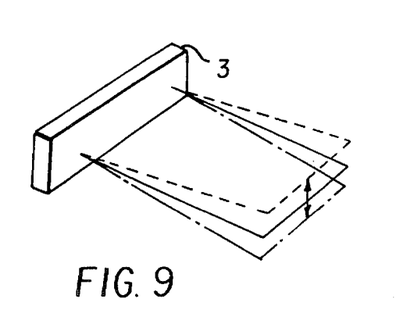
FIG. 9 is a diagram showing a bending vibration mode of a U-shape measuring tube.
Figure 10:
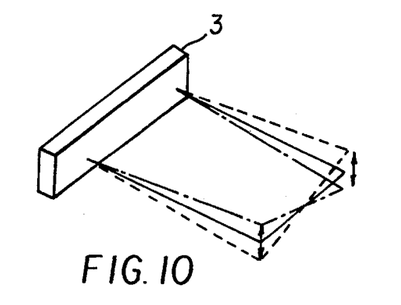
FIG. 10 is a diagram showing a torsional vibration mode of a U-shape measuring tube.

A vibration mode of the U-shape tube 1 is shown in FIG. 9. The strength of the Coriolis force is proportional to the mass and velocity of the fluid flowing through the tube 1 and its direction coincides with the direction of the vector product of the moving direction of the fluid and the angular velocity at which the tube 1 is vibrated. Since the moving directions of the fluid are opposite to each other on the inlet and outlet sides of the U-shape tube 1, the Coriolis forces acts in the opposite directions to both arms of the U-shape tube 1 to generate a torsional torque in the U-shape tube 1. The torsional torque changes at the same frequency with the excitation frequency at which the tube 1 is vibrated and its amplitude value is proportional to the mass flow rate of the fluid. FIG. 10 shows the vibration mode excited by the torsional torque.

Figure 11:
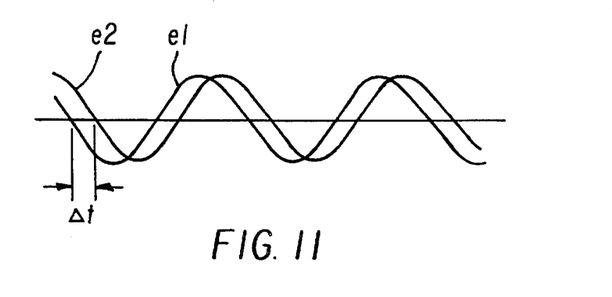
FIG. 11 is a wave chart showing examples of pickup signals.

The mass flow rate of the fluid can be measured by detecting torque amplitude of the torsional vibration with the pickups 11, 12. Since, in an actual vibration of the U-shape tune 1, the torsional vibration by the Coriolis force is superimposed onto the excitation vibration by the electromagnetic drive coil 4, the vibration on the upstream side is expressed as $\sin(\omega t - \alpha)$ and the vibration on the downstream side as $\sin(\omega t + \alpha)$. Therefore, signals e1 and e2 detected by the pickups 11 and 12 respectively show waveforms having phase difference $\Delta t$ between them as illustrated in FIG. 11. The phase difference $\Delta t$ depends on the tube and the excitation frequency. In the case of the U-shape tube 1 with a resonance frequency of 80 Hz, a phase difference of about 120 μS is obtained at the maximum flow rate of 18 kg/min. Therefore, resolution of 60 nS is required in the time measurement to guarantee the resolution of 1% in one-twentieth of this 120 μS dynamic range.

Figure 12:
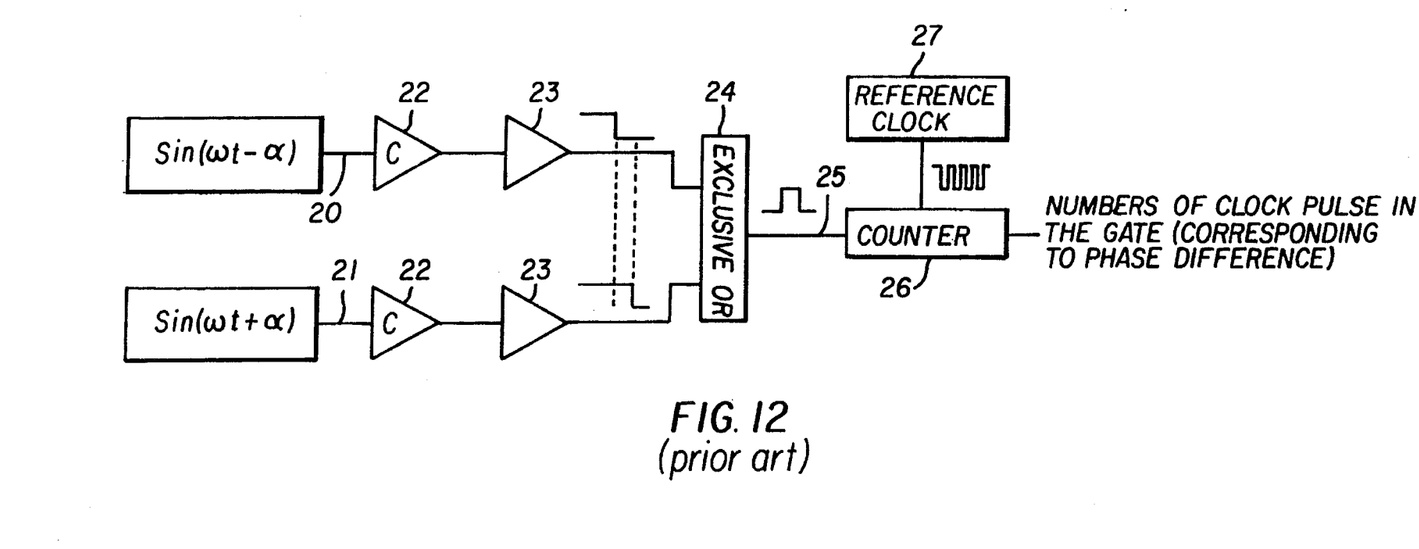
FIG. 12 is a block diagram showing a circuit for phase difference detection according to the counter method.

The simplest method, among the various methods proposed, for measuring the phase difference counts the number of reference clock pulses corresponding to pulse width of a time difference gate pulse. FIG. 12 shows a block diagram of a circuit used for the phase difference measuring method. In FIG. 12, an upstream pickup signal 20 and a down stream pickup signal 21 are amplified by amplifiers 22 with amplification factor C and the amplified signals are digitized to binary signals by comparators 23. An exclusive OR circuit 24 applies an exclusive-OR operation to the binary signals to obtain a gate pulse 25, the pulse width of which corresponds to the time difference between the upstream and downstream pickup signals. A counter 26 measures the pulse width of the gate pulse 25 in cooperation with a reference clock 27. In this case, a reference clock pulse frequency of more than 20 MHz is required.

In practice, the U-shape tube has drawbacks such as pressure loss and difficulty of cleaning caused by its curved shape. To solve these problems, straight tube Coriolis type mass flow meters have been proposed, an example of which is shown in FIG. 13.

Figure 13:
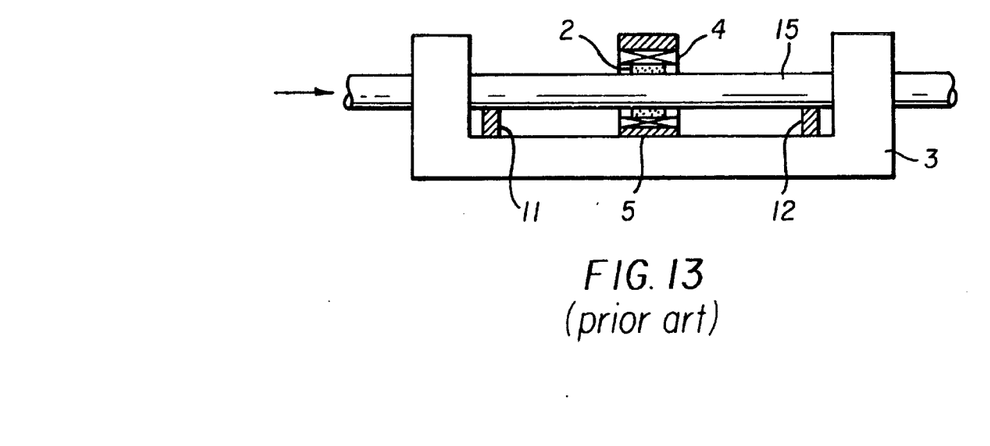
FIG. 13 is a diagram showing an example of a straight tube Coriolis type mass flow meter.

In FIG. 13, the flow meter includes a straight tube 15 through which the fluid to measured flows. The permanent magnet 2 is fixed at a central portion of the tube 15 and both ends of the tube 15 are fixed to the base 3. An electromagnetic drive coil 4 is disposed in a manner that the drive coil 4 sandwiches the straight tube 15 and a support frame 5 tightly fixed to the base 3 for supporting the drive coil 4. Since the straight tube shows high rigidity and is harder to bend than the U-shape tube, the above described time difference for the straight tube becomes much smaller than that for the U-shaped tube.

In the case of the straight tube 15, which usually shows a resonance frequency of 1 kHz, a phase difference of about 2 μS is obtained at the maximum flow rate of 18 kg/min. Therefore, resolution of 1 nS is required in the time measurement to guarantee a resolution of 1% in one-twentieth of this 2 μS dynamic range. In addition to this, if the above described measuring method which uses a counter is applied, a reference clock of 1 GHz is required which is difficult to manufacture. Even if the reference clock of 1 GHz is obtained, the counter method further requires a comparator for obtaining the time difference signal. The comparator may subject to fluctuations cause by a dead band of the input signal and it is quite difficult to obtain the precision of 1 nS. Here, intermediate levels between "1" and "0" of the signal output from the comparator is designated as a dead band, and how quickly the input signal crosses the dead band greatly affects to the fluctuations.

Figure 14:
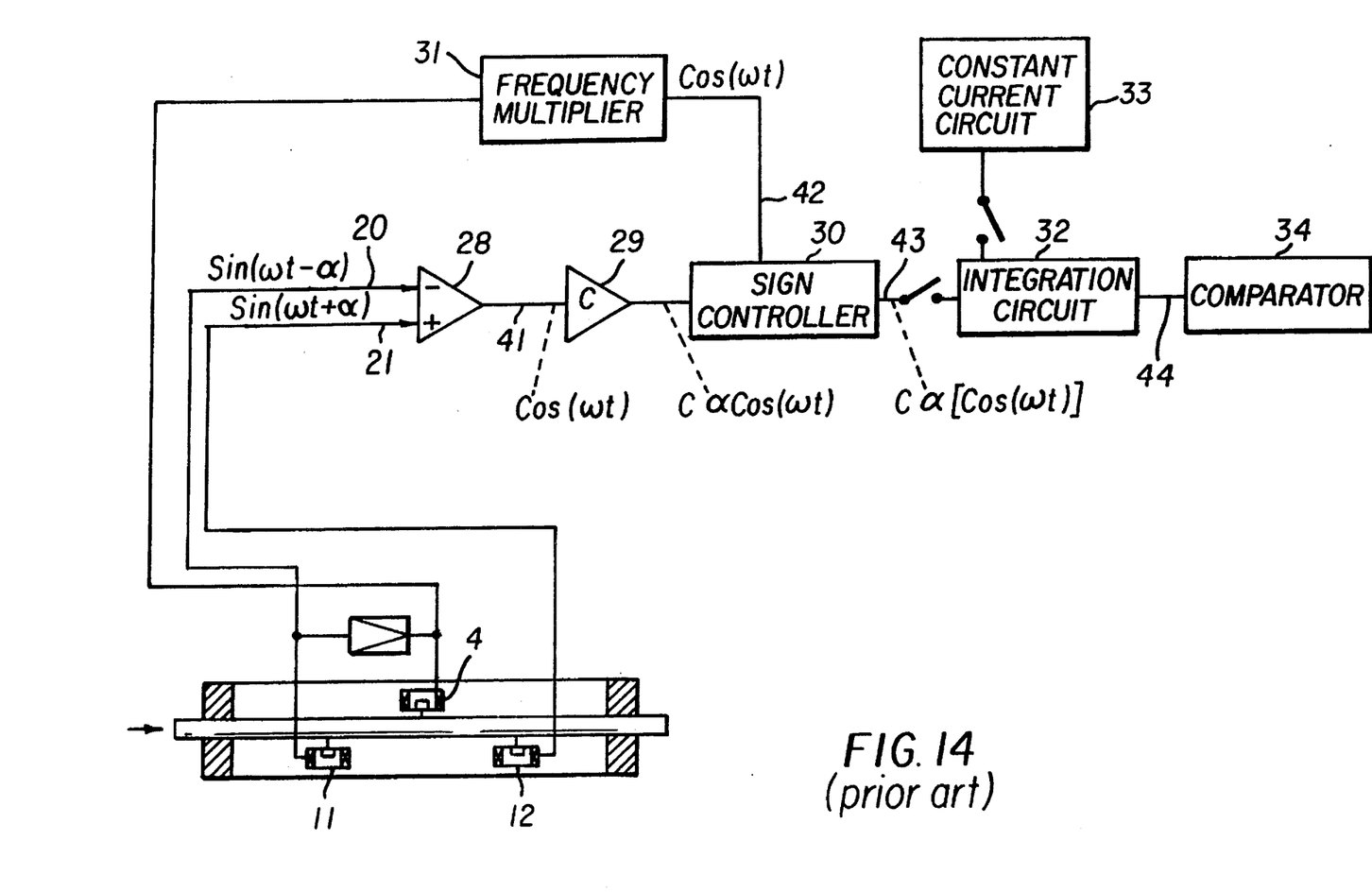
FIG. 14 is a block diagram showing a circuit for differential phase difference detection.
Figure 15A:
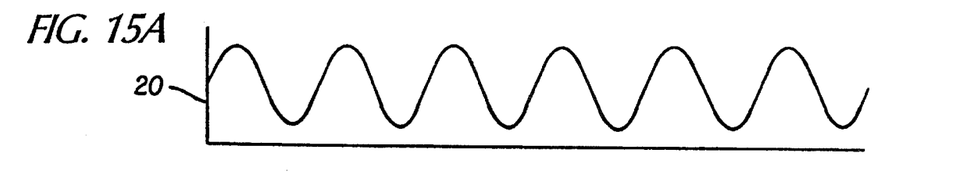
FIG. 15 is a chart showing waveform of major parts of FIG. 14.
Figure 15B:
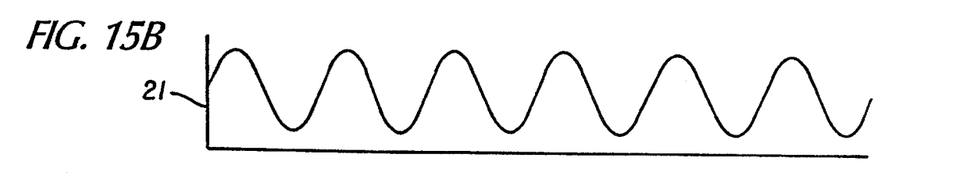
Figure 15C:
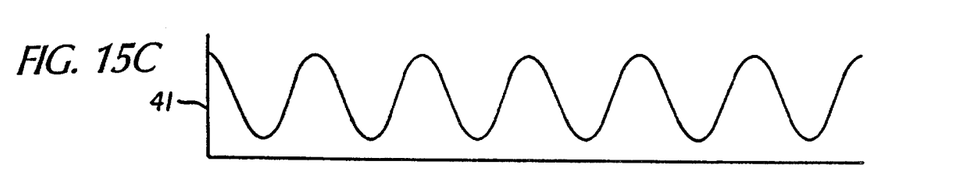
Figure 15D:
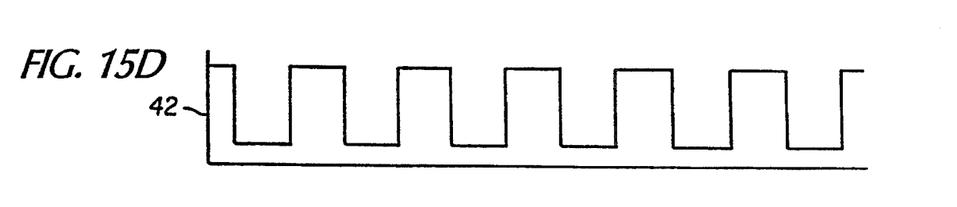
Figure 15E:
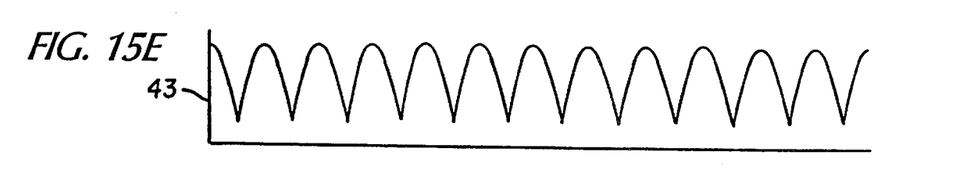
Figure 15F:
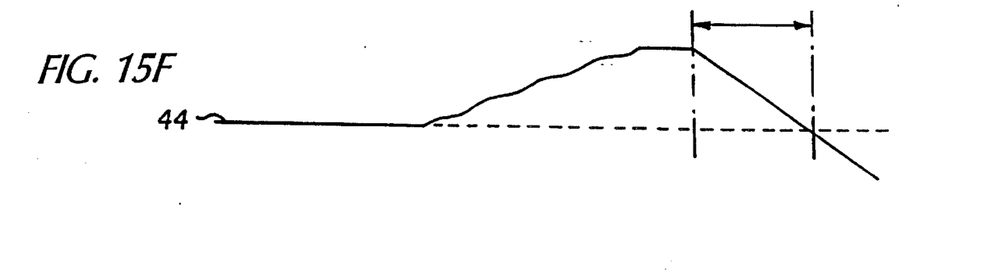

Because of these reasons described above, a Coriolis type mass flow meter according to the prior art is constructed as shown in FIG. 14. The mass flow meter of FIG. 14 conducts measurement and subtracts the upstream pickup signal 20 from the downstream pickup signal 21 in a difference calculation circuit (subtracter) 28 to obtain a weak phase signal with amplitude of sin α in which the phase α is 0.1 nS for the cycle of 1 mS.

$$\sin(\omega t + \alpha) - \sin(\omega t - \alpha) = 2 \cos \omega t \cdot \sin \alpha$$

An amplifier 29 amplifies the obtained phase signal with high amplification factor and a frequency multiplier 31 obtains $\cos \omega t$ by advancing the phase of an excitation current $\sin \omega t$ of the electromagnetic drive coil by 90 degrees. A sign controller 30 switches sign of its output by outputting $C \cdot \sin \alpha \cdot \cos \omega t$ when the $\cos \omega t$ is a positive value and $C \cdot (-\cos \omega t \cdot \sin \alpha)$ when the $\cos \omega t$ is a negative value. The sign controller obtains sign control timing not from waveforms, which are the objects of the sign control, but from the other signal to reduce influence of mis-operation caused by the noise.

There are many techniques for measuring the thus obtained $C \cdot \sin \alpha \cdot \cos_\omega t$. When one measures the $C \cdot \sin \alpha \cdot \cos_\omega t$ as a time span with a microcomputer (μ-computer), a value $C \cdot \sin \alpha$ is converted in a comparator 34 to a corresponding pulse width by initially charging a capacitor with a current corresponding to the $C \cdot \sin \alpha \cdot \cos_\omega t$ during several cycles as indicated by 44 in FIG. 14, then discharging the capacitor through a constant current circuit 33 by switching a switch SW and measuring a time span between the time at which the switch SW is switched and the time at which the output of an integral circuit 32 crosses a predetermined threshold. The phase difference is then obtained by measuring the pulse width with the μ-computer. Since the sin $\alpha$ is very small, it is approximated by $\alpha$ in FIG. 14.

FIG. 15 shows signal waveforms of major parts of FIG. 14 when the amplitude values of the upstream and downstream detection signals are the same and the sign control signal synchronizes with $\cos_\omega t$. These signals are expressed by following equations.

$V_U = A \cdot \sin(_\omega t - \alpha)$: upstream detection signal 20
$V_D = A \cdot \sin(_\omega t + \alpha)$: downstream detection signal 21
$V_v = 2A \cdot \sin \alpha \cdot \cos_\omega t \; n = m$:
upstream/downstream difference signal 41
$V_S =$ Rectangular Wave[$\Sigma \cos (2n + 1)_\omega t - \alpha$] $n = 0$:
sign control signal 42
$V_C = |C \cdot 2A \cdot \sin \alpha \cdot \cos_\omega t|$:
upstream/downstream difference signal after
sign control processing 43
$V_i = \int |C \cdot 2A \cdot \sin \alpha \cdot \cos_\omega t| dt$: integral signal 44

However, the phase measurement described above is applicable only when the amplitude values of the upstream and downstream detection signals coincide with each other and an error is caused by a difference between the amplitude values of the detection signals which is expressed by following equations, assignment of reference symbols in which are listed below.

$_\omega$: resonance frequency of a vibrating tube
$\alpha$: phase difference generated by mass flow rate
A: amplitude of downstream detection signal
B: amplitude of upstream detection signal
C: amplification factor 1. Output of the subtracter $V_v$ $$V_v = A \cdot \sin(_\omega t + \alpha) - B \cdot \sin(_\omega t - \alpha)$$
$$= 2A \cdot \sin \alpha \cdot \cos_\omega t - (B - A) \cdot \sin(_\omega t - \alpha)$$

2. Sign control signal $V_S$

The sign control signal VS typically corresponding to $\cos_\omega t$ is obtained by frequency multiplying the input current $\sin_\omega t$ of the drive coil.
$V_S = +1$ when $\cos_\omega t \geq 0$, and
$V_S = -1$ when $\cos_\omega t < 0$.

3. Output of the sign controller $V_C$ $$V_C \propto V_s \cdot C[2A \cdot \sin \alpha \cdot \cos_\omega t - (B-A) \cdot \sin(_\omega t - \alpha)]$$

4. Output of the integration circuit $V_i$ $$V_i \propto \int_{T1}^{T2} [2A \cdot C \cdot \sin \alpha \cdot V_s \cdot \cos_\omega t - (B - A) \cdot C \cdot V_S \cdot \sin(_\omega t - \alpha)] dt =$$

$$2A \cdot C \cdot \sin \alpha \int_{T1}^{T2} V_S \cdot \cos_\omega t \, dt -$$

$$(B - A) \cdot C \int_{T1}^{T2} V_S \cdot \sin(_\omega t - \alpha) \, dt,$$

where T1=0 and T2=4 π.

As described above, a difference occurs in the output $V_i$ of the integral circuit, as the second term of the above equation expresses, caused by the difference of the amplitude values (B≠A), which further causes an integration error.

Figure 16:
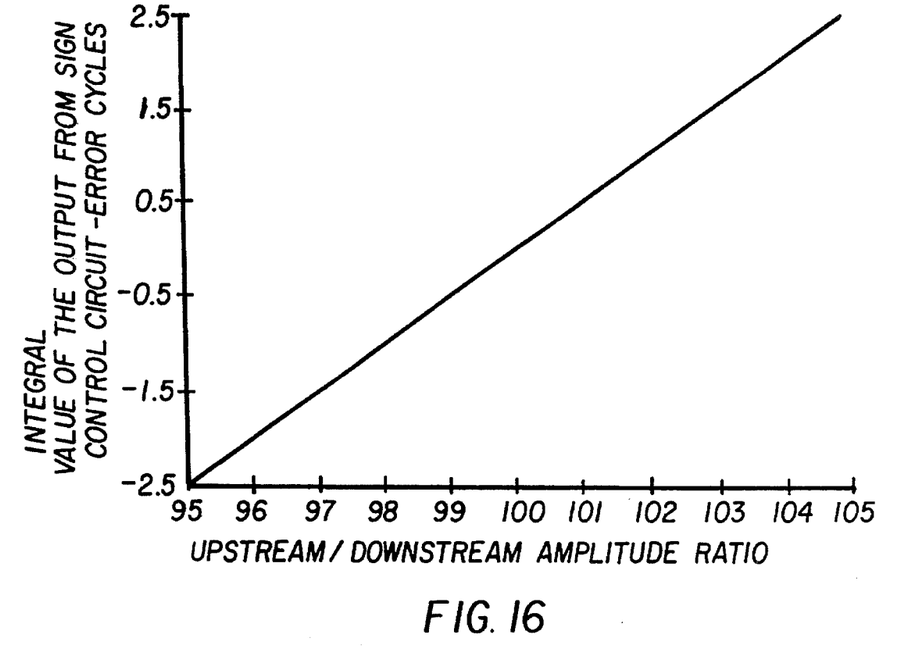
FIG. 16 is a chart for explaining measurement error in the circuit of FIG. 14.

FIG. 16 shows an error expressed by a following equation when the vibration frequency of the vibrating tube is 1 kHz and generated time difference is 2 μS.

$$\text{error} = \frac{\int (B \neq A) - \int (B = A)}{\int (B = A)} \cdot 10^2,$$

where $\int(B=A)$ expresses an integration value when the amplitude values are the same, and $\int(B\neq A)$ an integration value when the amplitude values are different.

Figure 17:
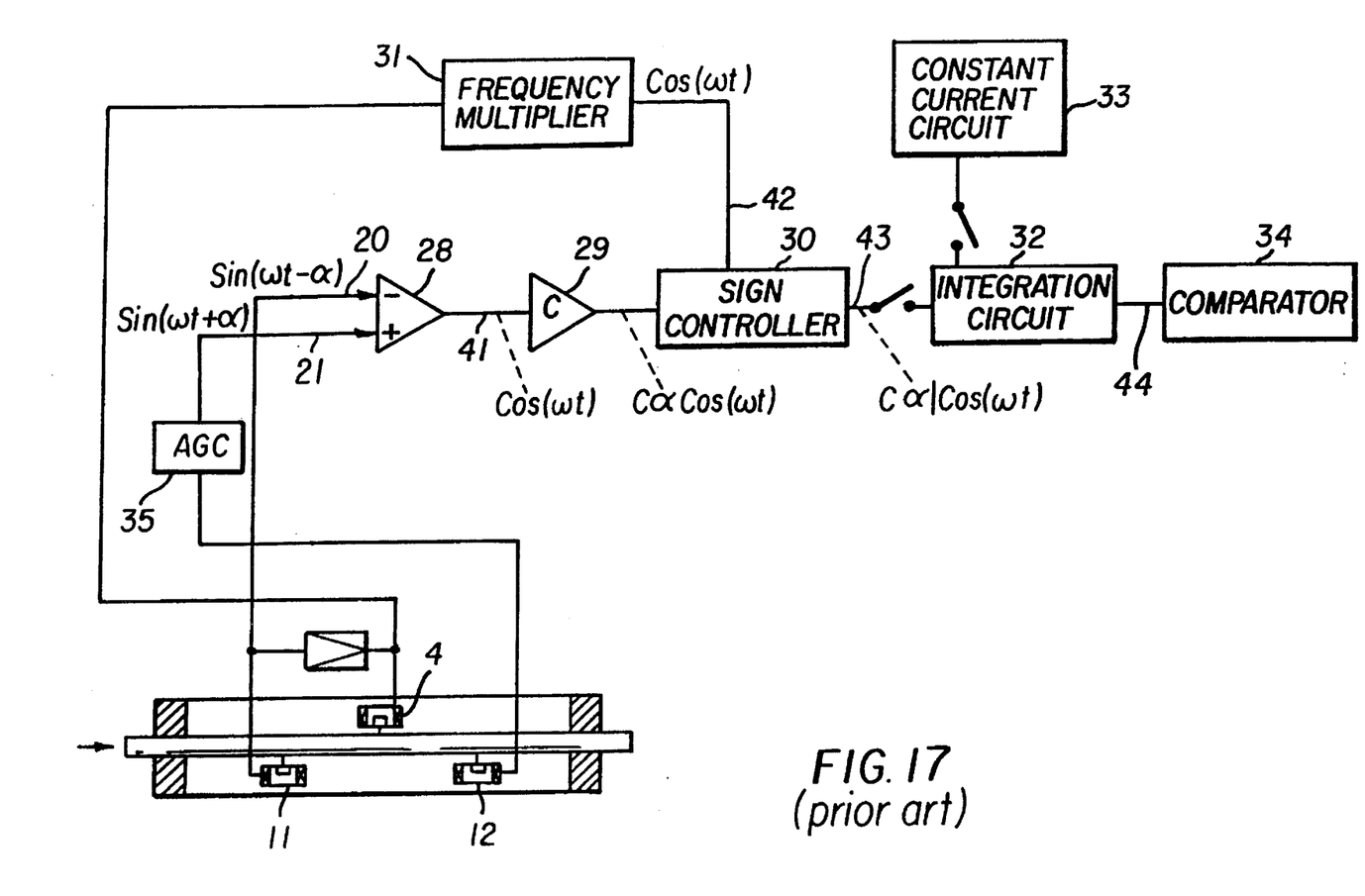
FIG. 17 is a block diagram showing a circuit modified from FIG. 14.
Figure 18:
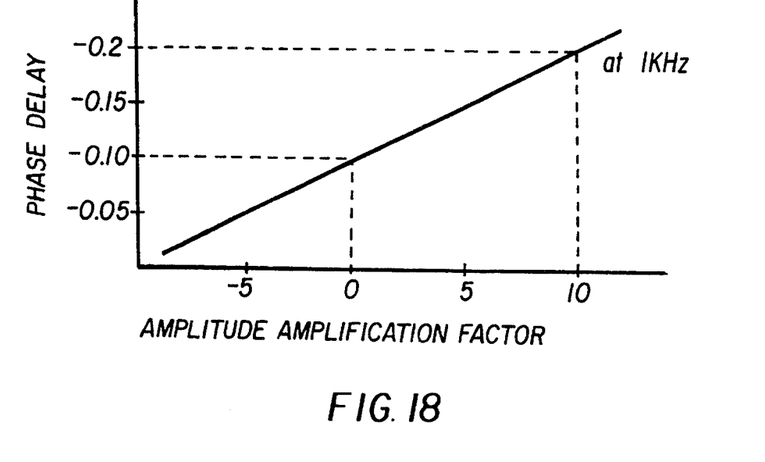
FIG. 18 is a chart showing AGC delay in the AGC amplifier of FIG. 17.

From FIG. 16, the error as defined above is 0.5% of the indicated value when the amplitude value difference is 1% (upstream/downstream amplitude value ratio is 101%). The amplitude value difference is reduced to some extent, for example by an AGC amplifier (automatic gain control amplifier) 35, as shown in FIG. 17, which can vary its amplification factor. However, it is difficult to realize the target error of 0.01% by installation of the AGC amplifier, because the AGC amplifier causes phase delay which varies with the amplification factor of the AGC amplifier as shown in FIG. 18.

To solve these problems, one of the inventors of the present invention proposed in the Japanese Patent Application (No. H05-110802, not yet laid open) a mass flow meter (hereinafter referred to as the proposed flow meter) which is comprised of the first pickup further comprising a permanent magnet and the first detection coil the output of which is fixed; and the second pickup further comprising an electromagnet and the second detection coil positioned opposed facing to the electromagnet, in which an input DC current to the electromagnet is controlled so as to equalize the output signal amplitude of the second detection coil the output signal amplitude of the first detection coil.

Figure 19:
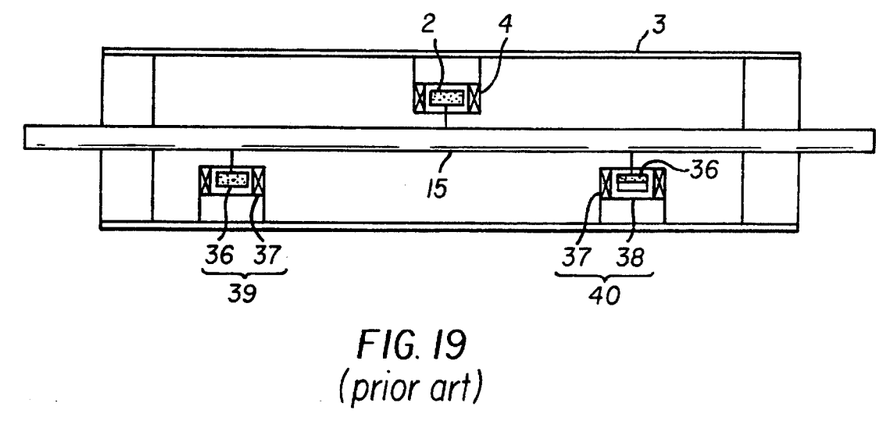
FIG. 19 is a diagram showing a configuration of the proposed Coriolis type mass flow meter.

FIG. 19 is a diagram showing a configuration of the proposed flow meter. As shown in FIG. 19, the proposed flow meter is comprised of a first pickup (fixed output type pickup) 39 for detecting velocity of a fluid to be measured which includes a permanent magnet 36 and the first detection coil 37, and a second pickup (variable output type pickup) 40, the output signal amplitude of which is controlled so as to be equalized to the output signal amplitude of the first pickup and which includes an electromagnet 38 and the second detection coil 37. The output signal amplitude values of the first and second pickups are equalized by controlling the intensity of the line of magnetic force interlinking the second detection coil 37 by adjusting the input DC current to the electromagnet 38 to vary intensity of the line of magnetic force which the electromagnet 38 generates.

In FIG. 19, the permanent magnet 36 and the electromagnet 38 are fixed to the straight tube 15. The permanent magnet 36 and the electromagnet 38 are excited to vibrate in the same modes with the straight tube 15 to detect variation of the line of magnetic force which interlinks the detection coil 37. As an alternative, the permanent magnet 36 and the electromagnet 38 may be fixed to the base 3 to which the detection coil 37 is fixed. In this case, magnetic paths from the permanent magnet 36 and the electromagnet 38 may preferably be cut by the straight tube 15.

Figure 20:
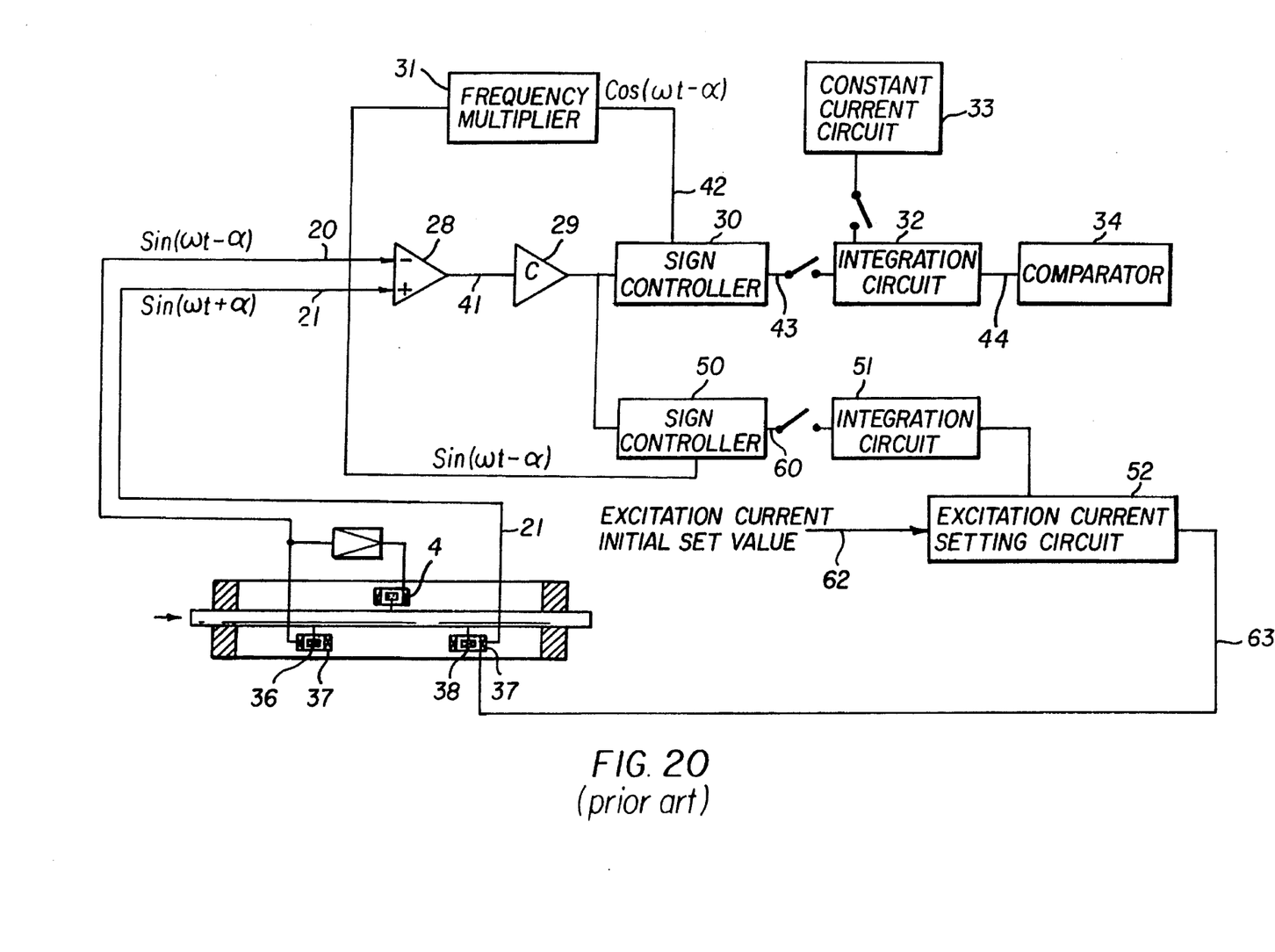
FIG. 20 is a block diagram showing a circuit for controlling the mass flow meter of FIG. 19.

An example of a control circuit for equalizing the outputs of the fixed and variable output type pickups is shown in FIG. 20. The control circuit of FIG. 20 calculates the difference between the upstream pickup signal 20 and the downstream pickup signal 20 by the subtracter 28, and obtains a weak phase signal $2A.\sin\alpha.\cos_\omega t$, with amplitude of $\sin\alpha$ in which the phase $\alpha$ is 0.1 nS for a cycle of 1 mS, and the upstream/downstream output amplitude value difference signal $(B-A).\cos(_\omega t-\alpha)$. The control circuit amplifies the phase signal with high amplification factor C by the amplifier 29 and switches the sign of the phase signal by a sign controller 50 which obtains a signal in-phase with the input signal when the upstream pickup signal $\sin(_\omega t-\alpha)$ is positive and an antiphase signal to the input signal when the upstream pickup signal $\sin(_\omega t-\alpha)$ is negative.

As a result of this sign control, only a signal which is in-phase with $\sin(_\omega t-\alpha)$, that corresponds to a term representing the output amplitude value difference between the upstream and downstream pickups, is obtained. The obtained signal is then integrated during n cycles (4 cycles in this example) by an integration circuit 51. The above described data processings are expressed by following equations.

(a) Output of the subtracter $V_V$ $$V_v = A \cdot \sin(_\omega t + \alpha) - B \cdot \sin(_\omega t - \alpha)$$
$$= 2A \cdot \sin\alpha \cdot \cos_\omega t - (B-A) \cdot \sin(_\omega t - \alpha)$$

(b) Sign control signal $V_S 1$

The control signal $V_S 1$ is obtained from the output waveform $\sin(_\omega t-\alpha)$ of the upstream detector.
$V_S 1 = +1$ when $\sin(_\omega t-\alpha) \geq 0$, and
$V_S 1 = -1$ when $\sin(_\omega t-\alpha) < 0$.

(c) Output of the sign controller $V_C 1$ $$V_C 1 \propto V_S 1 \cdot C \cdot [2A \cdot \sin\alpha \cdot \cos_{107} t + [B-A] \cdot \sin(_\omega t - \alpha)]$$

(d) Output of the integration circuit $V_i 1$ $$V_i 1 \propto \int_{T1}^{T2} [2A \cdot C \cdot \sin\alpha \cdot V_S 1 \cdot \cos_\omega t +$$

$$(B-A) \cdot C \cdot V_S 1 \cdot \sin(_\omega t - \alpha)] dt =$$

$$2A \cdot C \cdot \sin\alpha \int_{T1}^{T2} V_S 1 \cdot \cos_\omega t \, dt +$$

$$2(B-A) \cdot C \left[ \int_{T1}^{T2} V_S 1 \cdot \sin(_\omega t - \alpha) \right] dt =$$

$$8A \cdot C \cdot \sin\alpha \cdot V_S 1/_\omega \cdot |\sin_\omega t|_{T1}^{T3} +$$

$$(-4) \cdot (B-A) \cdot C/_\omega \cdot |\cos(_\omega t - \alpha)|_{T1}^{T3}$$

If the limits of integration are chosen as follows;
T1: $\alpha/_\omega$,
T2: $\alpha/_\omega + 4\pi$, and
T3: $\alpha/_\omega + 2\pi$,
the above $V_i 1$ (61 in FIG. 20) is expressed by a following equation.

$$V_i 1 = 8A \cdot C \cdot \sin\alpha \cdot V_S 1/_\omega \cdot |\sin_\omega t|_{T1}^{T3} +$$

$$(-4) \cdot (B-A) \cdot C/_\omega \cdot |\cos(_\omega t - \alpha)|_{T1}^{T3} =$$

$$-16 \cdot A \cdot C \cdot \sin^2\alpha/_\omega + 8 \cdot (B-A) \cdot C/_\omega$$

The first term of the above equation represents an integral value when no amplitude difference remains and the second term represents an integral value when the amplitude difference remains. The first term can be neglected since the $\sin^2\alpha$ in the first term is sufficiently smaller than 1.

An output of the integration circuit 51 is fed to an excitation current setting circuit 52. The output amplitude values of the both detectors are equalized to each other by controlling, with the output of the excitation current setting circuit 52, the electromagnet 38 of the variable output type pickup. Thus, it becomes possible to equalize the output amplitude values of the upstream and downstream pickups by the AGC technique which controls the intensity of the line of magnetic force without causing any phase delay. In the above example, one of the pickups (fixed output type pickup) is comprised of the permanent magnet 36 and the detection coil 37 and another pickup, which is controlled, is comprised of the DC electromagnet 38 and the detection coil 37. Electromagnets may be used for the both magnets. In this case, the DC excitation current of one of the electromagnet is fixed and the DC excitation current of another electromagnet is controlled.

In FIG. 19, the permanent magnet 36 and the electromagnet 38 are fixed to the straight tube 15. The permanent magnet 36 and the electromagnet 38 are excited to vibrate in the same mode with the straight tube 15 to detect variation of the line of magnetic force which interlinks the detection coil 37. As an alternative, the permanent magnet 36 and the electromagnet 38 may be fixed to the base 3 to which the detection coil 37 is fixed. In this case, a magnetic paths from the permanent magnet 36 and the electromagnet 38 may preferably be cut by the straight tube 15.

Figure 21:
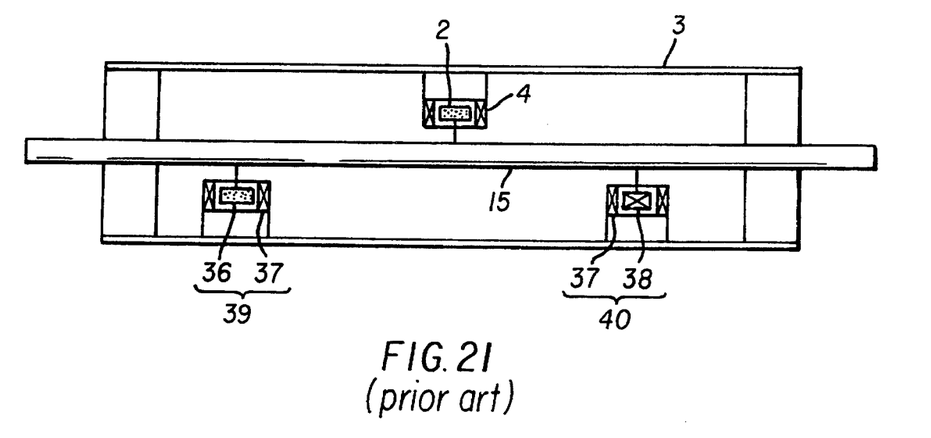
FIG. 21 is a block diagram showing a circuit modified from FIG. 19.

FIG. 21 shows a modification of FIG. 19. The flow meter of FIG. 21 is obtained by constructing a magnetic field generation portion of FIG. 20 with a permanent magnet 36 and a DC electromagnet 38. The permanent magnet 36 functions as a bias magnetic field and the DC electromagnet 38 functions as an output adjuster of the detection coil 37. The other functions are the same with those of FIG. 20 and their explanations are omitted.

The proposed flow meter has the following drawbacks since lead wires, for feeding the excitation current to the DC electromagnet disposed on the side of the tube, are extended from the base towards the tube: (1) possibility of breaking of wire is high; and (2) the lead wires function as a load of the vibration system to causes lowering of mechanical Q of the vibration system.

Therefore, an object of the present invention is to provide a Coriolis type mass flow meter which improves measurement precision by eliminating the mechanical Q lowering and by controlling the output amplitude values of the upstream and downstream pickups at a constant value.

SUMMARY OF THE INVENTION

The object of the present invention is achieved by a Coriolis type mass flow meter having first and second electromagnetic velocity detectors that detect asymmetric bending vibrations of a vibrating tube, which depend on mass flow rate and are excited in association with torsional vibrations of the tube vibrated by Coriolis force generated by flow of a fluid through the tube and angular vibrations of the tube, which Coriolis type mass flow meter is configured as follows.

In a first embodiment, the first detector comprises a ferromagnetic member disposed on the side of the tube, an excitation coil and a first induction coil, in which the excitation and first induction coils are disposed on the side of a base, and the second detector comprises a permanent magnet disposed on the side of the tube and a second induction coil disposed on the side of the base, in which output voltage amplitude of the second induction coil is fixed. A control means controls an input DC current of the excitation coil for varying an intensity of a magnetic field generated by the excitation coil to equalize an output voltage amplitude of the first induction coil to the output voltage amplitude of the second induction coil.

In a second embodiment, the first detector comprises a ferromagnetic member disposed on the side of the tube and a self-induction coil disposed on the side of a base, and the second detector comprises a permanent magnet disposed on the side of the tube, and an induction coil disposed on the side of the base, the output voltage amplitude of which is fixed. A control means controls an input DC current of the self-induction coil for varying an intensity of a magnetic field generated by the self-induction coil to equalize an output voltage amplitude of the self-induction coil to the output voltage amplitude of the induction coil.

In a third embodiment, the first detector comprises a first ferromagnetic member disposed on the side of the tube, a first excitation coil, and a first induction coil, in which the first excitation and induction coils are disposed on the side of a base, and the second detector comprises a second ferromagnetic member disposed on the side of the tube, a second excitation coil, and a second induction coil, in which the second excitation and induction coils are disposed on the side of the base. A control means fixes an input DC current of the second excitation coil at a fixed value for maintaining output voltage amplitude of the second induction coil at a fixed value and controls an input DC current of the first excitation coil for varying an intensity of a magnetic field generated by the first induction coil to equalize an output voltage amplitude of the first induction coil to the output voltage amplitude of the second induction coil.

In a fourth embodiment, the first detector comprises a first ferromagnetic member disposed on the side of the tube and a first self-induction coil disposed on the side of a base, and a second detector comprises a second ferromagnetic member disposed on the side of the tube and the second self-induction coil disposed on the side of the base. A control means fixes an input DC current of the second self-induction coil at a fixed value for maintaining output voltage amplitude of the second self-induction coil at a fixed value and controls an input DC current of the first self-induction coil for varying an intensity of a magnetic field generated from the first self-induction coil to equalize an output voltage amplitude of the first self-induction coil to the output voltage amplitude of the second self-induction coil.

By comprising one of the upstream and downstream tube vibration velocity sensors of a ferromagnetic member disposed on the tube side, and a self-induction coil or a couple of an excitation coil and an induction coil disposed on the base side, lowering of mechanical Q of the vibration system and time delay in AGC are avoided. As a result, a highly reliable measurement of a phase difference between the detection coil outputs is facilitated.

BRIEF DESCRIPTION OF THE DRAWINGS

The invention will be described in detail with reference to the following detailed description of the preferred embodiments and the accompanying drawings, wherein.

DETAILED DESCRIPTION OF THE PREFERRED EMBODIMENTS

Figure 1:
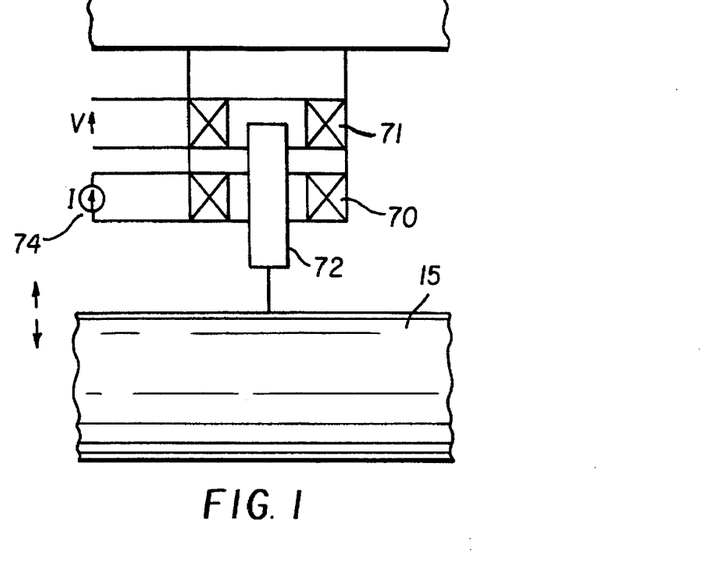
FIG. 1 is a diagram showing a basic configuration for tube vibration detection.

FIG. 1 is a diagram showing a basic configuration for tube vibration detection in accordance with the invention that includes an excitation coil 70, an induction coil 71, and a ferromagnetic member 72. The excitation coil 70 and the induction coil 71 are fabricated by winding wiring around a cylindrical bobbin. The excitation and induction coils are fixed to the base 3 by support mechanisms, not shown, with the top end face of one of the coils in close contact with the bottom end face of the other coil. The ferromagnetic member 72 is formed into a circular column. The ferromagnetic member 72 is fixed to the tube 15 by a support mechanism, not shown, with its central axis aligned with the central axes of the excitation and induction coils 70, 71.

When the tube 15 vibrates, the ferromagnetic member 72 repeats vertical motion on the central axes of the excitation and induction coils 70, 71. The excitation coil 70 generates magnetic flux by a constant DC current supplied from a variable DC current supply 74. Most of the magnetic flux passes through the moving ferromagnetic member 72. The vertical motion of the ferromagnetic member 72 varies the magnetic flux which interlinks the induction coil 71 and the variation rate of the magnetic flux with time is output from the induction coil 71 as induced voltage V.

The induced voltage V is expressed by a following equation;

$$\text{Induced voltage } V = d\Phi/dt = dM/dt \cdot I_\infty I_\omega \cos(\omega t - \alpha),$$

where $\Phi$ designates magnetic flux interlinking the induction coil, I an excitation current flowing through the excitation coil, and M mutual inductance between the excitation and the induction coils which varies with position $\sin(\omega t - \alpha)$ of the ferromagnetic member.

The above equation represents that amplitude of the induced voltage V generated in the induction coil can be varied by controlling the excitation current I flowing through the excitation coil with the variable DC current supply 74. The induced voltage advances by 90 degrees when the vibration of the tube is expressed by $\sin(\omega t - \alpha)$.

Figure 2:
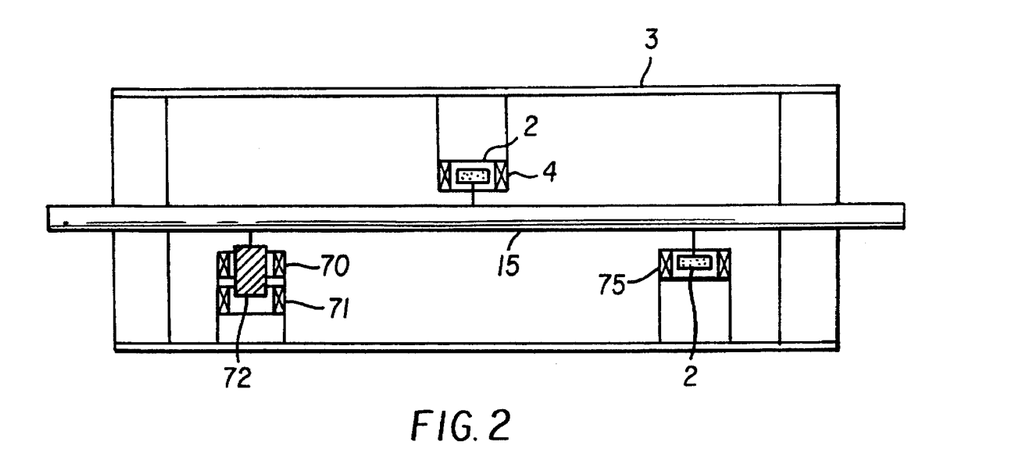
FIG. 2 is a diagram showing a main portion of an embodiment constructed by using the basic configuration of FIG. 1.

FIG. 2 is a diagram showing a main portion of an embodiment constructed by using the basic configuration of FIG. 1. As shown in FIG. 2, one of the upstream and downstream tube vibration velocity detection sensors (right hand side of the figure) is comprised of the permanent magnet 2 disposed on the side of the tube 15 and the induction coil 75 disposed on the side of the base 3. The output voltage amplitude of the induction coil 75 is fixed at a constant value. Another sensor (left hand side of the figure) is comprised of the ferromagnetic member 72 disposed on the side of the tube 15, and the excitation coil 70 and the induction coil 71. The both coils 70 and 71 are disposed on the side of the base 3. The output voltage amplitude of the induction coil 71 is controlled to be coincident with the output voltage amplitude of the induction coil 75 by adjusting the DC current flowing through the excitation coil 70.

Figure 3:
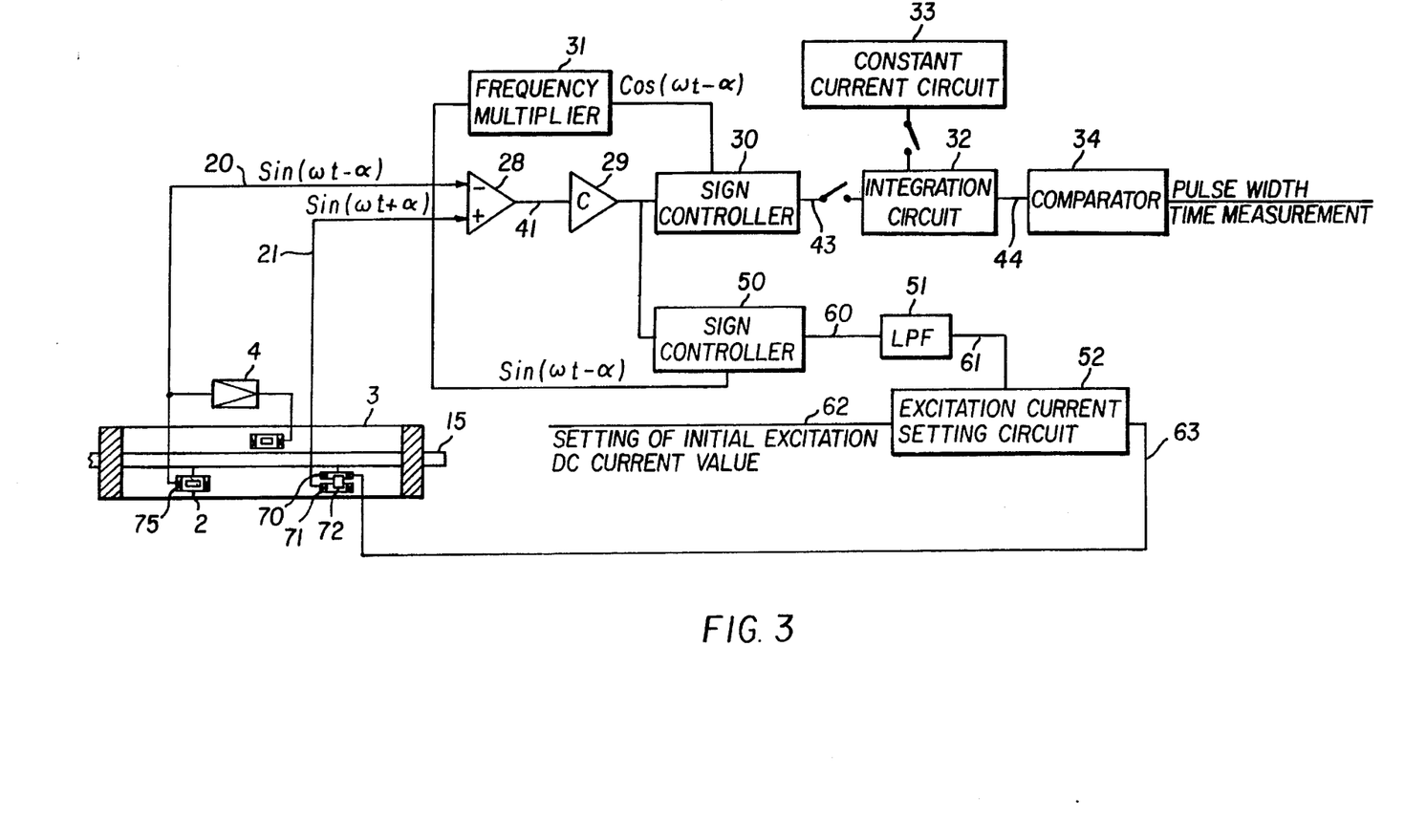
FIG. 3 is a block diagram showing a circuit for controlling the sensors of FIG. 2.

FIG. 3 shows a circuit block diagram for the sensors of FIG. 2. Since the block circuit of FIG. 3 is essentially the same as that of FIG. 20 except for the configuration of the sensors, explanation of FIG. 3 is omitted.

Figure 4:
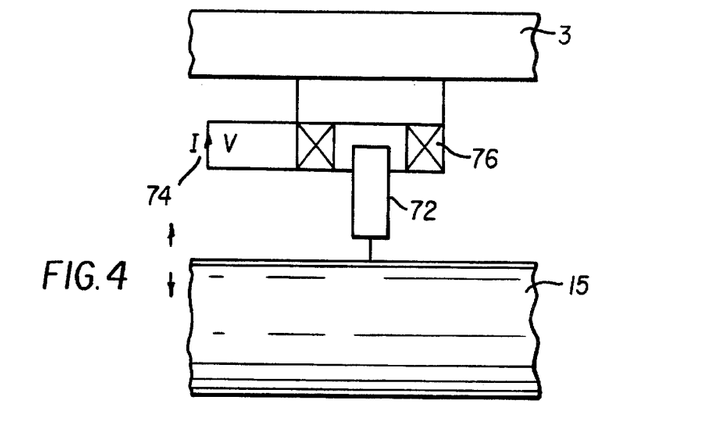
FIG. 4 is a diagram showing another basic configuration for tube vibration detection.

FIG. 4 is a diagram showing another basic configuration for tube vibration detection in accordance with the invention. In FIG. 1, the length of the ferromagnetic member 72 should be longer than the total thickness of the excitation and induction coils 70 and 71. In FIG. 4, the length of the ferromagnetic member 72 may be as long as that of the self-induction coil 76. The self-induction coil 76 is fabricated by winding wiring around a cylindrical bobbin and fixed to the base 3 by support a mechanism, not shown.

The ferromagnetic member 72 is formed into a circular column. The ferromagnetic member 72 is fixed to the tube 15 by a support mechanism, not shown, with its central axis aligned with the central axis of cylindrical bobbin of the self-induction coil 76. The ferromagnetic member 72 moves vertically in response to the vibration of the tube 15 on the central axis of the cylindrical bobbin of the self-induction coil 76. The self-induction coil 76 generates magnetic flux by a current set with a variable DC current supply. Most of the magnetic flux passes through the moving ferromagnetic member 72. The vertical motion in the ferromagnetic member 72 varies magnetic resistance of the self-induction coil, which further varies self-inductance of the coil 76.

Voltage induced across the self-induction coil 76 corresponds, as is expressed by a following equation, to the self-inductance;

$$\text{Induced voltage } V = dL/dt \cdot I_\infty I_\omega \cos(\omega t - \alpha),$$

where I designates an excitation current flowing through the self-induction coil, and L self-inductance of the self-induction coil which varies with position $\sin(\omega t - \alpha)$ of the ferromagnetic member.

Figure 5:
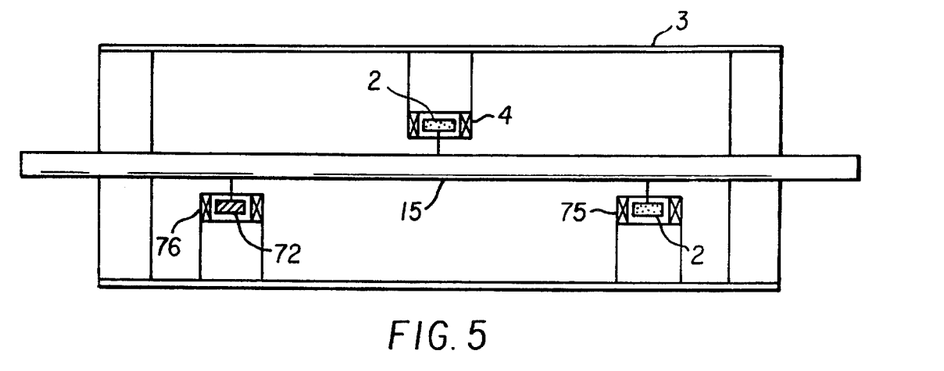
FIG. 5 is a diagram showing a main portion of an embodiment constructed by using the basic configuration of FIG. 4.

FIG. 5 is a diagram showing a main portion of an embodiment constructed by using the basic configuration of FIG. 4. As shown in FIG. 4, one of the upstream and downstream tube vibration velocity detection sensors (right hand side of the figure) is comprised of the permanent magnet 2 disposed on the side of the tube 15 and the induction coil 75 disposed on the side of the base 3. The output voltage amplitude of the induction coil 75 is fixed at a constant value. Another sensor (left hand side of the figure) is comprised of the ferromagnetic member 72 disposed on the side of the tube 15, and the self-induction coil 76 disposed on the side of the base 3. The output voltage amplitude of the self-induction coil 76 is controlled to be coincident with the output voltage amplitude of the induction coil 75 by adjusting the DC current flowing through the self-induction coil 76.

In FIG. 1, one of the upstream and downstream tube vibration velocity detection sensors (right hand side of the figure) is comprised of the permanent magnet 2 disposed on the side of the tube 15 and the induction coil 75 disposed on the side of the base 3, and another sensor (left hand side of the figure) is comprised of the ferromagnetic member 72 disposed on the side of the tube 15, the excitation coil 70 and the induction coil 71. The both coils 70 and 71 are disposed on the side of the base 3. It is very difficult to manufacture the sensors since the center of gravity and the weight of the permanent magnet and those of the ferromagnetic member should precisely balance with each other.

Figure 6:
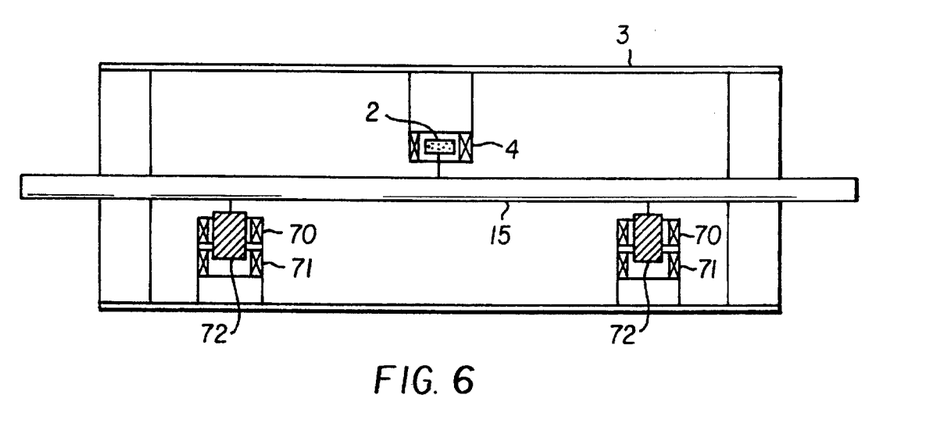
FIG. 6 is a diagram showing a main portion of another embodiment.

An embodiment illustrated in FIG. 6 avoids the above difficulty. In FIG. 6, both upstream and downstream tube vibration velocity detection sensors are comprised of the ferromagnetic member 72 disposed on the side of the tube 15, and the excitation and induction coils 70 and 71, disposed on the side of the base 3. The output voltage amplitude of one of the induction coils 71 is fixed at a constant value by a constant DC current flowing through on of the excitation coils corresponding the one of the induction coils. A DC current flowing through another excitation coil 70 is adjusted to equalize the output voltage amplitude value of another induction coil to the output voltage amplitude value of the one of the induction coils. The configuration of FIG. 6 facilitates stable vibration of the tube since the upstream and downstream tube vibration velocity detection sensors, which have exactly the same configuration, are symmetrically positioned.

Figure 7:
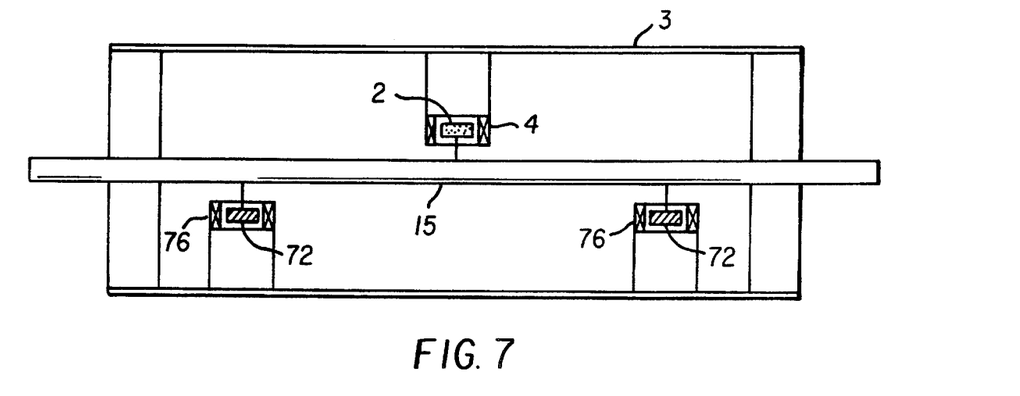
FIG. 7 is a diagram showing a main portion of still another embodiment.

FIG. 7 shows a modification of the embodiment shown in FIG. 5. In FIG. 7, similarly as in FIG. 6, both upstream and downstream tube vibration velocity detection sensors are comprised of the ferromagnetic member 72 disposed on the side of the tube 15, and the self-induction coil 76 disposed on the side of the base 3. The output voltage amplitude of one of the self-induction coils is fixed at a constant value by a constant DC current flowing through the this self-induction coil. A DC current flowing through another self-induction coil 76 is adjusted to equalize the output voltage amplitude values of the self-induction coils with each other. The control circuit of FIG. 3 is used for controlling the sensors of FIGS. 5, 6 and 7.

As has been explained already, the Coriolis type mass flow meter according to the present invention, which is comprised of a ferromagnetic member disposed on the tube side, and a self-induction coil or a couple of an excitation coil and an induction coil disposed on the base side, facilitates avoiding lowering of the mechanical Q of the vibration system and time delay in AGC. As a result, the Coriolis type mass flow meter of this invention measures the phase difference between the output signals of the detection coils with resolution of 0.1 nS.

The invention has been described with reference to certain preferred embodiments thereof. It will be understood, however, that modifications and variations are possible within the scope of the appended claims.

What is claimed is:

1. A Coriolis type mass flow meter comprising:

first and second electromagnetic velocity detectors for detecting asymmetric bending vibrations of a vibrating tube, said detectors being excited in association with torsional vibrations of said tube vibrated by Coriolis force generated by flow of a fluid through said tube and angular vibrations of said tube, wherein said first detector includes a ferromagnetic member coupled to said tube, and an excitation coil and a first induction coil coupled to a base, said ferromagnetic member being disposed within said excitation coil and said first induction coil, and wherein said second detector includes a permanent magnet coupled to said tube, and a second induction coil coupled to said base, said permanent magnet being disposed within said second induction coil and an output voltage amplitude of said second induction coil being fixed;

control means for controlling an input DC current of said excitation coil for varying an intensity of a magnetic field generated by said excitation coil to equalize an output voltage amplitude of said first induction coil to said output voltage amplitude of said second induction coil; and means for measuring a mass flow rate of said fluid by detecting a phase difference between outputs of said detectors.

2. A Coriolis type mass flow meter comprising:

first and second electromagnetic velocity detectors for detecting asymmetric bending vibrations of a vibrating tube, wherein said first and second detectors are excited in association with torsional vibrations of said tube vibrated by Coriolis force generated by flow of a fluid flowing through said tube and angular vibrations of said tube, wherein said first detector includes a ferromagnetic member coupled to said tube and a self-induction coil coupled to a base, said ferromagnetic member being disposed within said self-induction coil, and wherein said second detector includes a permanent magnet coupled to said tube, and an induction coil coupled to said base, said permanent magnet being disposed within said induction coil and an output voltage amplitude of said induction coil being fixed;

control means for controlling an input DC current of said self-induction coil for varying an intensity of a magnetic field generated by said self-induction coil to equalize an output voltage amplitude of said self-induction coil to said output voltage amplitude of said induction coil; and means for measuring mass flow rate of said fluid by detecting phase difference between output waveforms of said detectors.

3. A Coriolis type mass flow meter comprising:

first and second electromagnetic velocity detectors for detecting asymmetric bending vibrations of a vibrating tube, wherein said first and second electromagnetic detectors are excited in association with torsional vibrations of said tube vibrated by Coriolis force generated by flow of a fluid flowing through said tube and angular vibrations of said tube, wherein said first detector includes a first ferromagnetic member coupled to said tube, and a first excitation coil and a first induction coil coupled to a base, said first ferromagnetic member being disposed in said first excitation coil and said first induction coil, and wherein said second detector includes a second ferromagnetic member coupled to said tube, and a second excitation coil and a second induction coil coupled to said base, said second ferromagnetic member being disposed in said second excitation coil and said second induction coil;

control means for fixing an input DC current of said second excitation coil at a fixed value for maintaining an output voltage amplitude of said second induction coil at a fixed value and for controlling an input DC current of said first excitation coil for varying an intensity of a magnetic field generated by said first induction coil to equalize an output voltage amplitude of said first induction coil to said output voltage amplitude of said second induction coil; and means for measuring a mass flow rate of said fluid by detecting phase difference between output waveforms of said detectors.

4. A Coriolis type mass flow meter comprising:

first and second electromagnetic velocity detectors for detecting asymmetric bending vibrations of a vibrating tube, wherein said first and second detectors are excited in association with torsional vibrations of said tube vibrated by Coriolis force generated by flow of a fluid through said tube and angular vibrations of said tube, wherein said first detector includes a first ferromagnetic member coupled to said tube and a first self-induction coil coupled to a base, said ferromagnetic member being disposed within the first self-induction coil, and wherein said second detector includes a second ferromagnetic member coupled to said tube and a second self-induction coil coupled to said base, said second ferromagnetic member being disposed within said second self-induction coil;

control means for fixing an input DC current of said second self-induction coil at a fixed value for maintaining an output voltage amplitude of said second self-induction coil at a fixed value, and for controlling an input DC current of said first self-induction coil for varying an intensity of a magnetic field generated from said first self-induction coil to equalize an output voltage amplitude of said first self-induction coil to said output voltage amplitude of said second self-induction coil; and means for measuring a mass flow rate of said fluid by detecting phase difference between output waveforms of said detectors.

* * * * *